(12) United States Patent
Kauppinen et al.

(10) Patent No.: US 7,602,762 B1
(45) Date of Patent: Oct. 13, 2009

(54) SYSTEM AND METHOD FOR DETERMINING WHEN A CSCF SHOULD ACT LIKE I-CSCF OR LIKE S-CSCF

(75) Inventors: Risto Kauppinen, Helsinki (FI); Ilkka Westman, Helsinki (FI); Petteri Ylä-Outinen, Ojakkala (FI); Markus Martin, Helsinki (FI)

(73) Assignee: Nokia Corporation, Espoo (FI)

( * ) Notice: Subject to any disclaimer, the term of this patent is extended or adjusted under 35 U.S.C. 154(b) by 1134 days.

(21) Appl. No.: 10/333,757

(22) PCT Filed: Jul. 26, 2000

(86) PCT No.: PCT/EP00/07203

§ 371 (c)(1),
(2), (4) Date: Oct. 7, 2003

(87) PCT Pub. No.: WO02/09365

PCT Pub. Date: Jan. 31, 2002

(51) Int. Cl.
*H04J 3/24* (2006.01)
*H04Q 7/20* (2006.01)

(52) U.S. Cl. .................. 370/349; 370/354; 370/401; 455/456.5

(58) Field of Classification Search .............. 370/312, 370/349, 354, 401, 471; 455/418–420, 435.1, 455/435.2, 456.5
See application file for complete search history.

(56) References Cited

U.S. PATENT DOCUMENTS

| 5,109,220 A | 4/1992 | Breeden et al. |
| 5,111,451 A | 5/1992 | Piasecki et al. ............... 370/29 |
| 5,612,950 A | 3/1997 | Young ....................... 370/276 |

FOREIGN PATENT DOCUMENTS

WO 9952306 10/1999

OTHER PUBLICATIONS

Antonella Napolitano, et al., "UMTS all-IP Mobility Management, Call and session control Procedures", Mar. 24, 2000, pp. 1-24.
Jonne Soininen, "GPRS/UMTS" IAB Workshop, Feb. 29, 2000, pp. 1-34.

*Primary Examiner*—Lee Nguyen
(74) *Attorney, Agent, or Firm*—Mintz, Levin, Cohn, Ferris, Glovsky and Popeo, P.C.

(57) ABSTRACT

The invention proposes a network system comprising a first network element (2) and at least a second network element (3), the second network element being adapted to operate in at least two different modes, wherein the first network element (2) is adapted to send a message to the second network element, and the second network element (3) is adapted to set the mode in response to information included in the message and indicating whether a particular procedure is to be performed and/or has been performed. Thus, the second network element sets its mode dependent on whether a procedure like processing of a location request has to be performed or has not to be performed, or, whether a procedure has been performed or not. The network elements can be Call State Control Functions (CSCF).

38 Claims, 10 Drawing Sheets

SYSTEM AND METHOD FOR DETERMINING WHEN A CSCF SHOULD ACT LIKE I-CSCF OR LIKE S-CSCF

FIELD OF THE INVENTION

The present invention relates to a network system and a method for controlling a network element which can be set to at least two different modes.

BACKGROUND OF THE INVENTION

The invention relates to call control (CC) and in particular to the function of the so-called Call State Control Function (CSCF). The CSCF is typically included in a network node like a Call Processing Server (CPS).

The CSCF is the call control entity in the all-IP architecture responsible for supervising the call (or IP multimedia call). It handles the call establishment, supervision and disconnection signalling and may control resources associated with the call such as media gateways processing the various call related media streams.

The CSCF consists of two components: the Serving CSCF (S-CSCF) and the Interrogating CSCF (I-CSCF).

The Serving CSCF is used for mobile originated communications and also for supporting mobile terminated communications, it provides Serving Profile Database (SPD) and Address Handling (AH) functionality described below. The Serving CSCF supports the signalling interactions with the UE (User Entity). The Home Subscriber Server (HSS) is updated with the Serving CSCF address and the HSS sends the subscriber data to the Serving CSCF for storage.

The Interrogating CSCF is used for mobile terminated communications and is used to determine how to route mobile terminated calls. The Interrogating CSCF interrogates the HSS for information to enable the call to be directed to the Serving CSCF. The interrogating CSCF provides Incoming Call Gateway (ICGW) and AH functionality described below.

For mobile terminated communications both Serving CSCF and Interrogating CSCF functionality can be involved. For mobile originated communications Interrogating CSCF functionality is not required. Both Serving CSCF and Interrogating CSCF components can be provided in a single CSCF if required.

In the following, the CSCF functionality mentioned above is described in more detail.

The ICGW (Incoming call gateway) acts as a first entry point and performs routing of incoming calls. Furthermore, it performs an incoming call service triggering (e.g. call screening/call forwarding unconditional). Moreover, it performs a query address handling and communicates with the HSS.

The CCF (Call Control Function) carries out a call setup/termination and state/event management. It interact with MRF in order to support multi-party and other services, reports call events for billing, auditing, intercept or other purpose, and receives and processes application level registration. Furthermore, it also performs a query address handling. In addition, it may provide service trigger mechanisms (service capabilities features) towards Application & services network (VHE/OSA), may invoke location based services relevant to the serving network and may check whether the requested outgoing communication is allowed given the current subscription.

The SPD (Serving Profile Database) interacts with HSS in the home domain to receive profile information for the R00 all-IP network user and may store them depending on the SLA with the home domain. Furthermore, it notifies the home domain of initial user's access. In addition, it may cache access related information (e.g. terminal IP address(es) where the user may be reached etc.)

The AH (Address Handling) functionality performs analysis, translation, modification if required, address portability, and mapping of alias addresses. It furthermore may do temporary address handling for internetwork routing.

Moreover, an Originating CSCF (O-CSCF) is the CSCF where the originating party is registered and where the originating party services are handled (and the CCF functionality is invoked). On the other hand, the S-CSCF is the CSCF where the terminating party is registered and where the terminating party services are handled (using the CCF functionality).

During setup of a connection, a mobile station first transmits a setup message to the O-CSCF which, in turn, forwards a setup message to a CSCF acting as an I-CSCF. This CSCF, in turn, forwards a message to another CSCF which acts as an S-CSCF. The S-CSCF sends a setup message to the called party.

Thus, a setup for a connection is completed. However, during the setup procedure, it is difficult for a CSCF receiving a setup message to distinguish whether it should act as an I-CSCF or as an S-CSCF. For example, an I-CSCF does not have to perform the Call Control Function (CCF). Thus, it would be a waste of time and a waste of performance and capacity if a CSCF which is expected to act as an I-CSCF would act as an S-CSCF.

There are less optimal solutions for determining the mode the CSCF should operate in. For example, a less optimal method is shown in FIG. 9. According to FIG. 9, a SPD query is used for the decision. When an CSCF (in this example, the CSCF 93) receives a setup message form the O-CSCF 92, it performs an SPD query in order to find out whether the setup concerns a registered subscriber. Thus, it accesses its SPD 98. If the answer is yes, the CSCF identifies itself as an S-CSCF (as in the case of CSCF 95), otherwise (as it is in the case of CSCF 93), it identifies itself as an I-CSCF. If the CSCF identifies itself as an I-CSCF, the Location Request should then be done to the HSS 4. This problem does not only occur in the above-described examples. There are many situations in which a network element receiving a message like a setup message is not aware which function it should provide, i.e., in which mode it should operate.

SUMMARY OF THE INVENTION

Therefore, the object underlying the invention resides in removing the above drawbacks of the prior art.

According to a first aspect of the invention, this object is solved by a network system comprising a first network element and at least a second network element, the second network element being adapted to operate in at least two different modes, wherein the first network element is adapted to send a message to the second network element, and the second network element is adapted to set the mode in response to information included in the message and indicating whether a particular procedure is to be performed and/or has been performed.

That is, the second network element sets its mode depending on whether a procedure has to be performed or not, or, whether a procedure has been performed already or not. Therefore, no extra information has to be sent to the second network element.

Thus, the decision as to the mode can be performed easily and quickly by the second network element.

Furthermore, the first network element can be adapted to send the message without the information regarding the procedure, and the second network element can be adapted to set itself into a first mode and to perform the procedure in response to receiving the message without the information. In addition, the network system can comprise a third network element, wherein the second network element can be adapted to send a message to the third network element including information that the procedure was performed, and the third network element can be adapted to set itself into a second mode in response to receiving the message including the information that the procedure was performed.

By these measures, the second network element is set to the first mode in case a "normal" message without additional information was received. The third network element is set to the second mode in case a message including the additional information was received. This provides the advantage that the third network element accepts messages only from those second network elements which include the additional information into the message. Therefore, the security of a network can be improved since in this way.

That is, if a message (in particular, a setup message) is sent from a second network element operated by a different operator to a third network element operated by another operator, it does not include the additional information. Therefore, the third network element does not accept messages from the second network element since it does not switch to the required function. Hence, the third network element can only be connected to certain second network elements.

Moreover, the first network element can be adapted to send the message including the information that the procedure is to be performed, and the second network can be adapted to set itself into a first mode and to perform the procedure in response to receiving the message including the information. The network system may further comprise a third network element, wherein the second network element can be adapted to send a message to the third network element without information regarding the procedure, and the third network element can be adapted to set itself into the second mode in response to receiving the message without information regarding the procedure.

Furthermore, the second network element can be adapted to perform the procedure in response to receiving the message containing the information that the procedure has to be performed, and to send a result of the procedure to the first network element. The network system may further comprise a third network element, wherein the first network element sends a message without information regarding the procedure to the third network element, and the third network element is adapted to set itself into a second mode in response to receiving the message without information regarding the procedure.

That is, the second network element is utilised to perform only the requested procedure, for example, processing of a location request. The result of the procedure (i.e., the location determined) is utilised to contact the third network element.

Also this measure improves the security of the network, since requests from other network will be directed to the second network element first. There, it can be decided whether the procedure (e.g., processing of the location request) is allowed and whether a connection to the third network element is allowed or not.

The procedure mentioned above can be processing of a location request. The information regarding the procedure can be included in a flag within the message.

According to a further aspect of the invention, the above object is solved by a network system comprising a first network element and at least a second network element, the second network element being adapted to operate in at least two different modes, wherein the first network element has a predetermined function and is adapted to send a message to the second network element, and the second network element is adapted to set the mode in response to receiving the message from the first network element having the particular function.

The predetermined function of the first network element is a gateway function. In particular, the first network element can be a Gateway Call State Control Function (G-CSCF).

According to another aspect, the above object is solved by a network system comprising a first network element and at least a second network element, the second network element being adapted to operate in at least two different modes, wherein the first network element is adapted to send a message to the second network element, and the first and the second network elements are connected by connection means in a number corresponding to the different modes and is adapted to set the mode in response to the connection means via which the message is received from the first network element.

Thus, according to this measure, the second network element can be easily set into a requested mode without any additional or special commands. It simply required to send a message via the corresponding connection means.

The connection means can be ports located at the first network element or at the second network element. Furthermore, the connection means can be different IP addresses from which the message is sent or to which the message is sent.

The invention also proposes a method for controlling a network element, wherein the network element is adapted to operate in at least two different modes, the method comprising the steps of receiving a message; extracting information from the message regarding a procedure which has to be performed or which has been performed; and deciding the mode to be set for the network element on the basis of the extracted information.

As described above, the procedure can be processing of a location request.

Furthermore, the invention proposes a method for controlling a network element, wherein the network element is adapted to operate in at least two different modes, the method comprising the steps of receiving a message; and deciding the mode to be set for the network element on the basis of the function of a network element sending the message.

Moreover, the invention also proposes a method for controlling a network element, wherein the network element is adapted to operate in at least two different modes and the network element comprises input means in a number corresponding to the modes, the method comprising the steps of receiving a message; and deciding the mode to be set for the network element on the basis of the input means via which the message is received.

As described above, the input means can be ports or different IP addresses.

The network elements mentioned above can be Call State Control Functions (CSCF). The different modes can be an Interrogating CSCF (I-CSCF) functionality, a Serving CSCF (S-CSCF) functionality, an Originating CSCF (O-CSCF) functionality, a Media Gateway Control Function (MGCF) or the like.

The message transmitted between the first and the second network element and/or between the second and the third network element can be a setup message.

Thus, immediately upon starting a connection, i.e., setup of a connection, the corresponding network elements can be set to the correct modes without additional commands and without the need of negotiations between the network elements.

Furthermore, the invention can be advantageously applied to the Session Initiation Protocol.

Moreover, a database can be accessed in order to obtain information regarding a subscriber to which a setup is to be sent and to decide the mode of the second network element on the basis of the obtained information.

BRIEF DESCRIPTION OF THE DRAWINGS

The present invention will be more readily understood with reference to the accompanying drawings in which.

DETAILED DESCRIPTION OF PREFERRED EMBODIMENTS

In the following, the basic idea of the invention is described.

As mentioned above, the aim of the invention lies to set different modes (like I-CSCF or S-CSCF) of a network element like a CSCF. In principle, the mode of the network element can be set by one or more of the following ways:

A. By a deduction process based on the message received by the network element in question
  A.a. Message itself is a special message
  A.b. Message itself is not a special message but contains one or more flags and/or fields that convey the necessary information for deduction process
B. By a deduction process not based on the message received by the network element in question
  B.a. The deduction process is based on the address
    B.a.a. The deduction process is based on the address to which the message is received
    B.a.b. The deduction process is based on the address from which the message is received and/or the addresses of the elements it already has passed
  B.b. The deduction process is not based on the address
    B.b.a. The deduction process is based on the Subscriber, control or other information available to the network element
    B.b.b. The deduction process is not based on the subscriber, control or other information available to the network element but on the state information of the network element itself.

In other words the network element switches to a certain mode after the deduction process based on one or more of the following:
X1. the address that the message was sent from,
X2. the message itself,
X3. the content of the message,
X4. the address that the message was sent to,
X5. the state information of the network element,
X6. the subscriber, control or other information available in one or more databases of the network element,
X7. the subscriber, control or other information available in one or more databases outside the network element, where
"the message itself" refers to the name, type, format or similar characteristic of the message, and
"the content of the message" refers to one or more flags and/or fields of the message, each of which may contain simple or complex information gathered at one or more network elements that already have been passed.

In the following, preferred embodiments of the invention are described in more detail with reference to the accompanying drawings and with respect to the above-described general idea of the invention.

Figure 1:
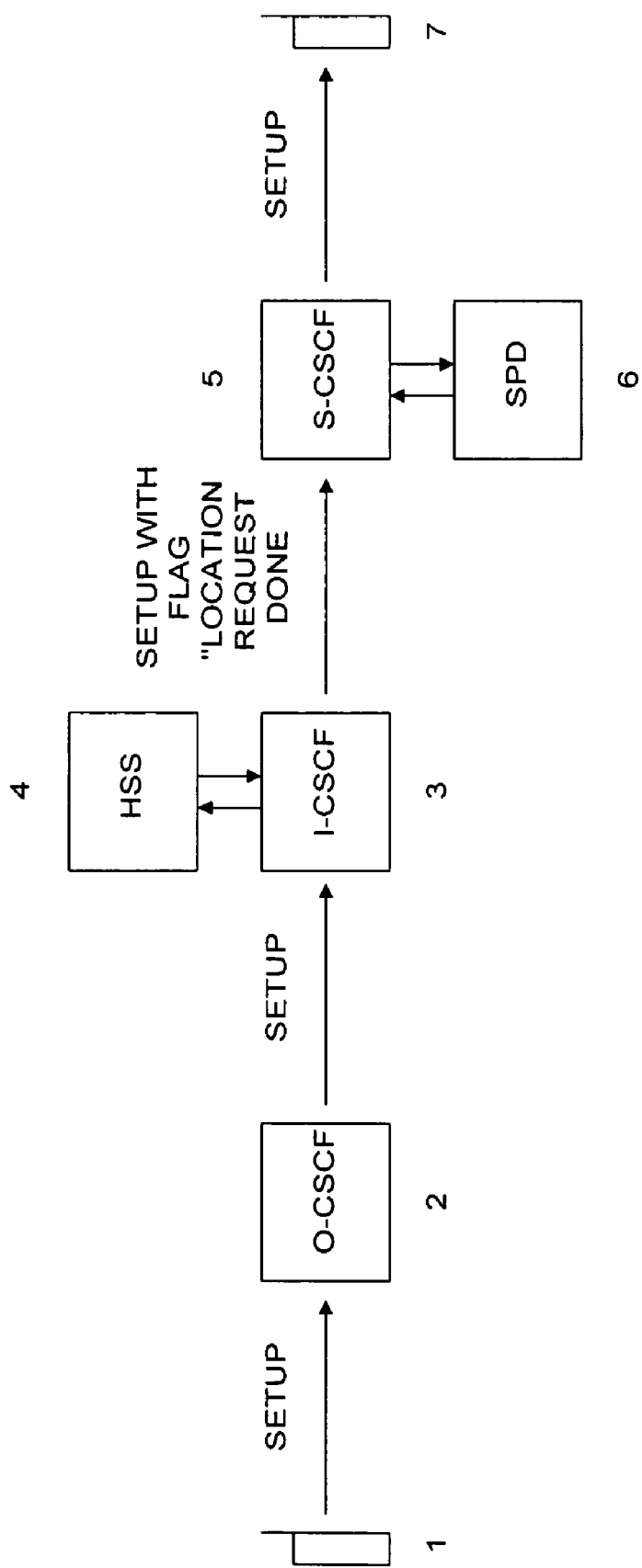
FIG. 1 shows a block diagram of a network system according to a first embodiment.

FIG. 1 illustrates a simplified block diagram of a network system according to a first embodiment of the invention.

In this embodiment, a setup procedure between a first mobile station 1 and a second mobile station 7 is carried out. As a matter of course, the User Entities (UE) are not limited to mobile stations but can also be fixed telephones, computer modems or the like. Furthermore, it is noted that a call as meant in this description does not only refer to telephony calls, but also to IP multimedia calls.

The mobile station 1 sends a setup message to a CSCF 2. Since this CSCF receives the setup message from a mobile station, it knows that it has to act as an Originating CSCF, i.e., an O-CSCF. After receiving the setup message, the O-CSCF 2 forwards a setup message to a further CSCF 3. This CSCF 3 acts as an Interrogating CSCF, i.e., this CSCF takes care of location requests. In particular, it accesses a Home Subscriber Server (HSS) 4 which provides information regarding the location of the subscriber to which a connection is to be established, i.e., the mobile station 7.

When the request is done, i.e., the location of the mobile station 7 is determined, the I-CSCF 3 sends a setup message to a further CSCF 5. The setup message comprises a flag "Location Request Done". Upon receiving the setup message including this particular flag, the CSCF 5 immediately knows that it has to act as a Serving CSCF (S-CSCF). The flag included in the setup message between the I-CSCF 3 and the S-CSCF 5 can be located in the setup message as an own field or it can be hidden in an existing field in a standardized manner.

The S-CSCF 5 accesses a Serving Profile Database (SPD) 6. The SPD 6 interacts with the HSS in the home domain of a subscriber in order to obtain information regarding the user and to notify the home domain regarding the location of the subscriber, or the like. Finally, the S-CSCF 5 sends a setup message to the mobile station 7 in order to complete the setup procedure.

Hence, according to the first embodiment, a CSCF which receives a setup message including information concerning that a location request is already done knows that it should act as an S-CSCF.

Thus, according to the first embodiment, a decision whether a particular CSCF should act like an I-CSCF or like an S-CSCF is performed by using a setup message with a special flag which is set when sent from the I-CSCF.

Hence, the method according to the first embodiment corresponds to items A.b. and X3 of the above-described general idea of the invention.

According to the first embodiment, a simple method is possible. By this method, it is easy to organise the network. This means, for example, that by the method according to the embodiment a requirement can be met that an I-CSCF of an other operator can only be connected from certain CSCF(s). This is in particular advantageous with respect to security of the network.

Figure 2:
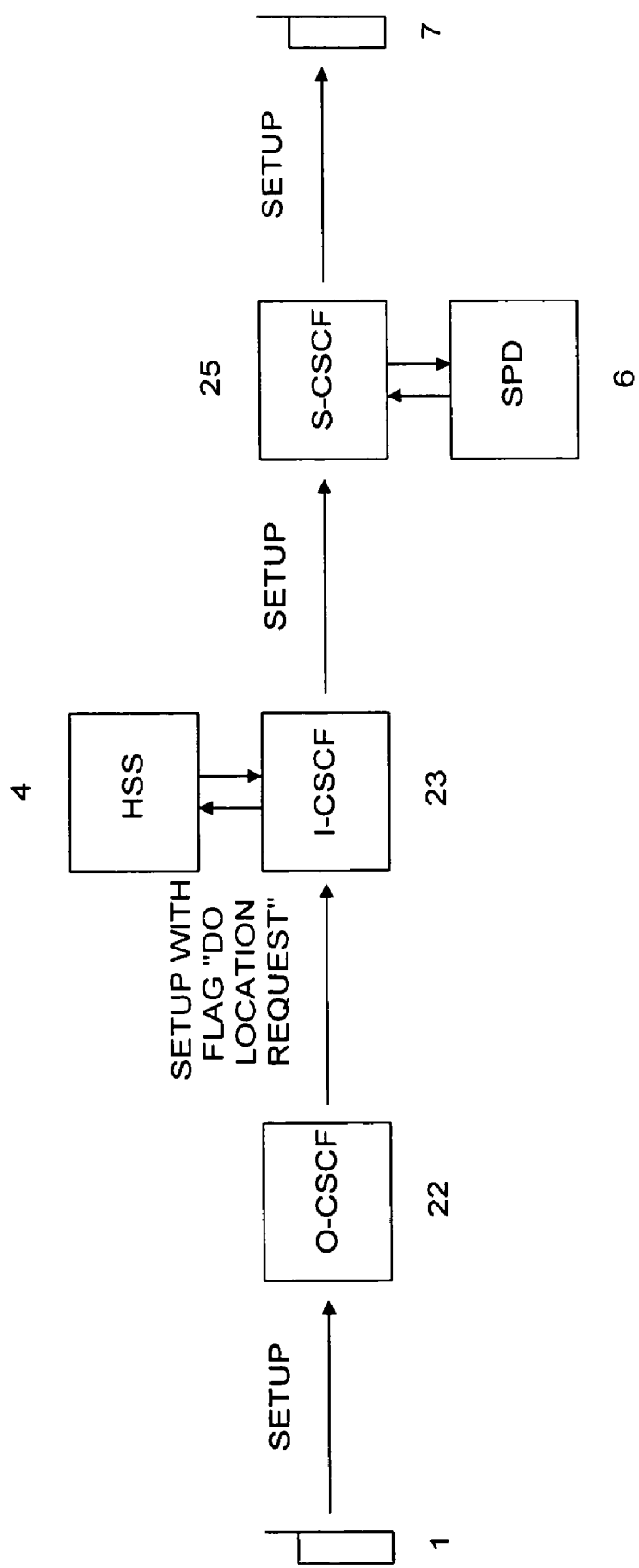
FIG. 2 shows a block diagram of a network system according to a second embodiment.

Next, a second embodiment is described by referring to FIG. 2. Parts denoted with the same reference numerals as in FIG. 1 are the same as that in FIG. 1. Thus, a detailed description is omitted here.

According to the second embodiment, the O-CSCF 22 sends a setup message to a further CSCF 23 upon receiving a setup message from the mobile station 1, as according to the first embodiment. However, according to the second embodiment this setup message between the CSCFs 22 and 23 includes a flag "do location request". By this flag, the CSCF 23 identifies itself as an I-CSCF. That is, each time the CSCF 23 receives a message which requests it to perform a location requests, the CSCF automatically knows that it should act as an I-CSCF and not as an S-CSCF.

When the processing of the location request is done, the I-CSCF 23 sends a setup message to the CSCF 25. In contrast to the first embodiment, no special flag is included here. According to the second embodiment, a CSCF immediately knows upon receiving a setup message without a special flag that it should act as an S-CSCF.

Thus, the method according to the second embodiment corresponds to items A.b. and X3 of the above-described general idea of the invention.

Also according to the second embodiment, a simple method can be achieved for the decision whether a CSCF in question should act as an I-CSCF or an S-CSCF.

Furthermore, the first and the second embodiment can be combined. That is, the setup message between the O-CSCF and the I-CSCF can contain the flag "do location request" and the setup message between the I-CSCF and the S-CSCF can contain the flag "location request is done". By this measure, a CSCF in question can easily distinguish in response to receiving the first or the second flag whether it should act as an I-CSCF or as an S-CSCF. By this measure, a more reliable determination of the role of the CSCF is possible.

Figure 3:
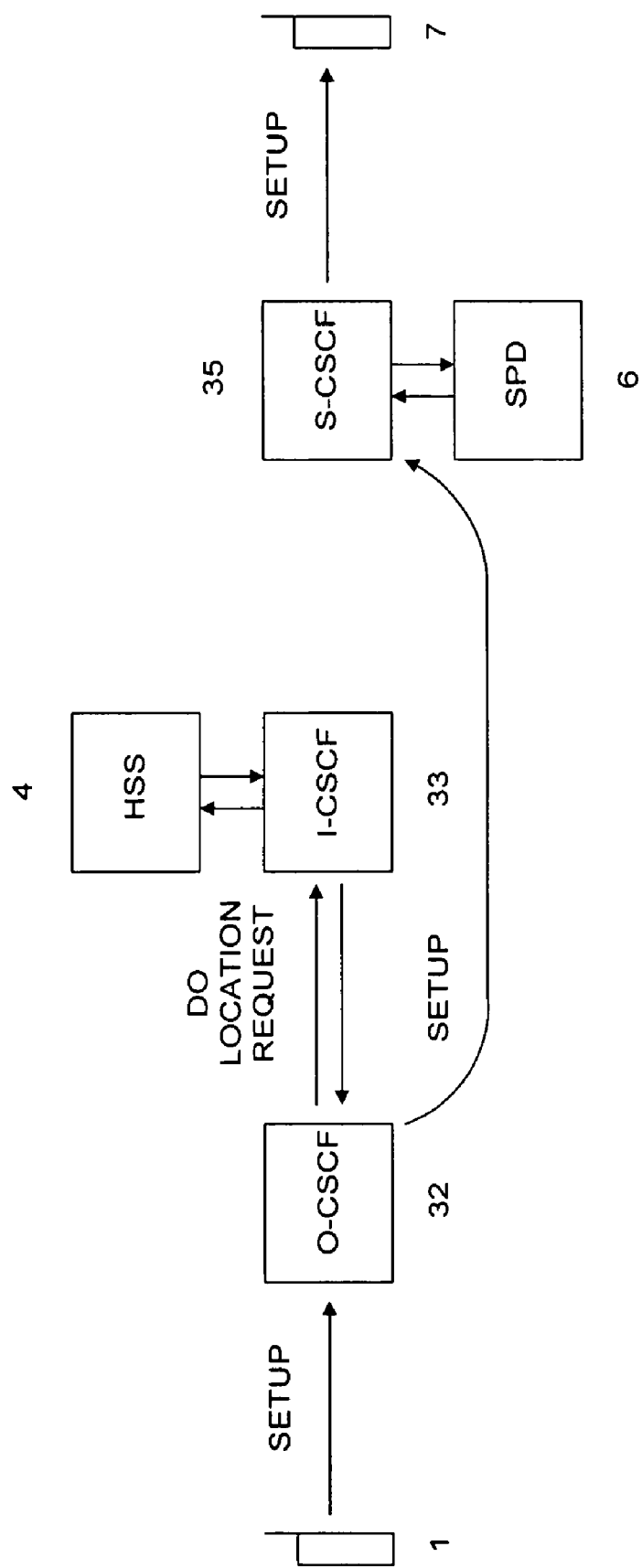
FIG. 3 shows a block diagram of a network system according to a third embodiment.

Next, a third embodiment is described with respect to FIG. 3.

Here, the O-CSCF 32 does not send a setup message to the I-CSCF but sends a location request to the I-CSCF 33. The I-CSCF gets the required location information regarding the called party (i.e., the mobile station 7) from the HSS 4. Then, the I-CSCF sends the location information back the O-CSCF 32. Thus, the O-CSCF 32 learns the location of the mobile station 7 and, therefore, the CSCF 35 to be contacted, and sends a setup message to the S-CSCF 35. The S-CSCF 35 sends a setup message to the mobile station 7 in order to complete the setup procedure.

Thus, according to the third embodiment, no special flags are included in the setup messages, but a special routing is used. Hence, the third embodiment corresponds to items A.a. and X2 of the general idea of the invention.

That is, a CSCF which receives a setup message automatically knows that it should act as an S-CSCF since a CSCF which has to act as an I-CSCF receives a message containing only a location request. Therefore, the S-CSCF knows that no procedure like performing of a location request is to be done.

Hence, also according to the third embodiment, a simple method for deciding whether a particular CSCF should act as an I-CSCF or as an S-CSCF can be achieved. In addition, a direct connection between the O-CSCF and the S-CSCF can be obtained since the O-CSCF obtains information regarding the location of the mobile station 7 and, thus, the S-CSCF which acts the serving CSCF for the mobile station 7.

Figure 4:
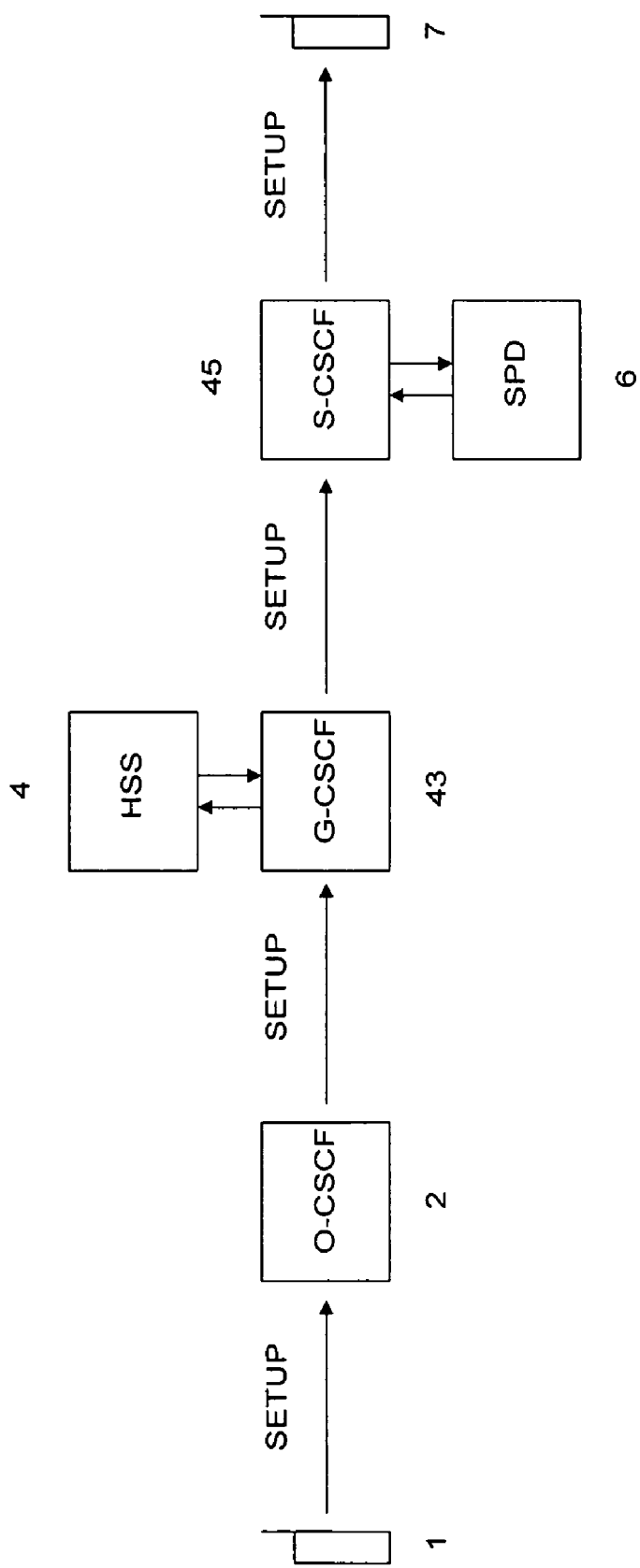
FIG. 4 shows a block diagram of a network system according to a fourth embodiment.

Next, a fourth embodiment is described by referring to FIG. 4.

Here, the O-CSCF 2 sends a setup message to a G-CSCF 43. This CSCF is a special CSCF which can only perform one function. That is, in contrast to the CSCF according to the previous embodiments, this CSCF cannot switch between different mode. According to the fourth embodiment, the function of the G-CSCF is a gateway function. In particular, no subscriber registration is possible in this CSCF.

The G-CSCF 43 automatically performs a location request procedure upon receiving a setup message. Thereafter, the G-CSCF 43 sends a setup message to a further CSCF 45. This CSCF is adapted to operate in two different modes, as according to the previously described embodiments. Here, the CSCF 45 knows automatically upon receiving the setup message that it should act as an S-CSCF.

Thus, according to the fourth embodiment, information regarding a predetermined procedure like processing of a location request is simply given by the fact that this processing is to be performed by a particular network element. That is, if another CSCF receives a setup message which does not include any flags regarding a location request, this CSCF knows that is has to act as a S-CSCF.

Hence, the fourth embodiment corresponds to items B.b.b. and X5 of the above-described general idea of the invention.

By the method according to the fourth embodiment, an I-CSCF of another operator can only be connected from certain CSCF(s). Thus, it is possible to improve the security of the network.

In the following, a fifth embodiment is described with respect to FIG. 5.

Here, every the CSCF listens to two different ports: the I-CSCF port and the S-CSCF port. When a setup message is received via the I-CSCF port, the I-CSCF functionality is started, while it is received via the S-CSCF port, the S-CSCF functionality is started. The I-CSCF port is the default port of IPT (Internet Protocol Telephony).

Thus, depending on to which port a message is sent, the CSCF sets itself into an I-CSCF or an S-CSCF mode.

Hence, the fifth embodiment corresponds to items B.a.a. and X4 of the above-described general idea of the invention.

Figure 5:
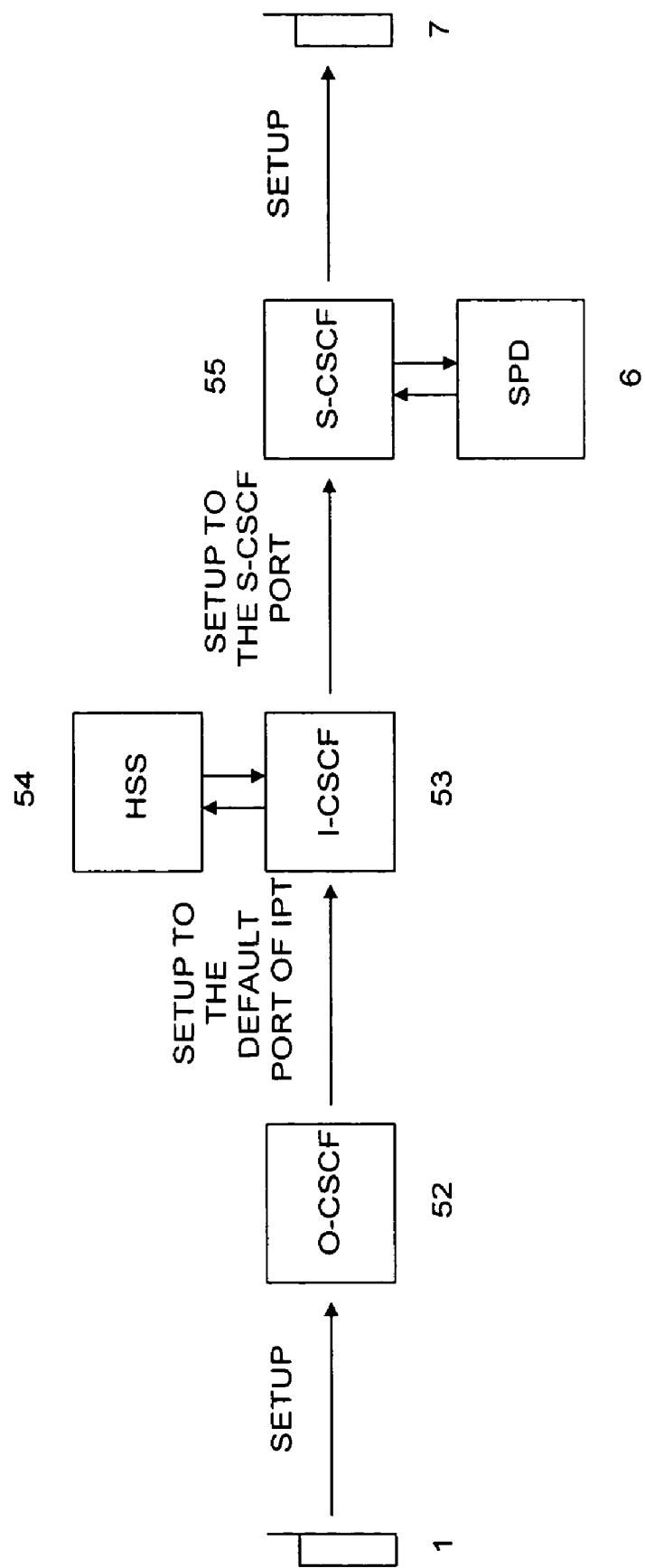
FIG. 5 shows a block diagram of a network system according to a fifth embodiment.

According to the illustration in FIG. 5, the O-CSCF 52 sends a setup message to the default port of the CSCF 53. Thus, the CSCF knows that it should act as an I-CSCF and performs a location request by referring to a HSS 54. That is, when the CSCF has received the setup message at the default port, it identifies itself as an I-CSCF and performs a location request to the HSS. The HSS 54 responds with the IP address and the S-CSCF port number of the CSCF where the subscriber (i.e., mobile station 7) is registered. The I-CSCF 53 sends the setup message further to the given port of the S-CSCF 55.

After the registration is accomplished, the HSS 54 knows the S-CSCF port number and the IP address of the S-CSCF 55 which has to be contacted. The S-CSCF port may be whichever port the S-CSCF has chosen provided that it isn't the default port of IPT. In this context, the port refers to e.g. a TCP/IP port. The TCP/IP port is a field in the Internet TCP and UDP protocol headers that identify the upper layer protocol and entity on top of the TCP of UDP protocol layer. Generally, a port is an identifier in a lower layer protocol header that identifies the upper layer protocol.

Thus, according to the fifth embodiment, the decision whether a CSCF should act as an I-CSCF or as an S-CSCF is performed by sending the setup message to a certain port of the CSCF when the I-CSCF functionality is wanted and to a different port when the S-CSCF functionality is wanted.

Preferably, for identifying and addressing the different ports of the CSCF, the port numbers of the IP protocol can be used.

According to the fifth embodiment, a simple method for the decision can be achieved. Furthermore, as according to all embodiments, no complicated rules are needed in the basic call state models to decide which functionality should be started. The decision is made on the basis of the port number, via which the setup message was received. Furthermore, no extra standardisation is needed, because the setup is sent to the CSCF always to the default IPT port, except to the S-CSCF port in case the CSCF in question is selected as the S-CSCF.

Next, a sixth embodiment is described with reference to FIG. 6.

In contrast to the fifth embodiment, the CSCF does not have different ports but different IP addresses. That is, depending on to which IP address of a particular CSCF a setup message is sent, the CSCF acts as an I-CSCF or as an S-CSCF. Thus, the sixth embodiment corresponds to items B.a.a. and X4 of the above-described general idea of the invention.

Figure 6:
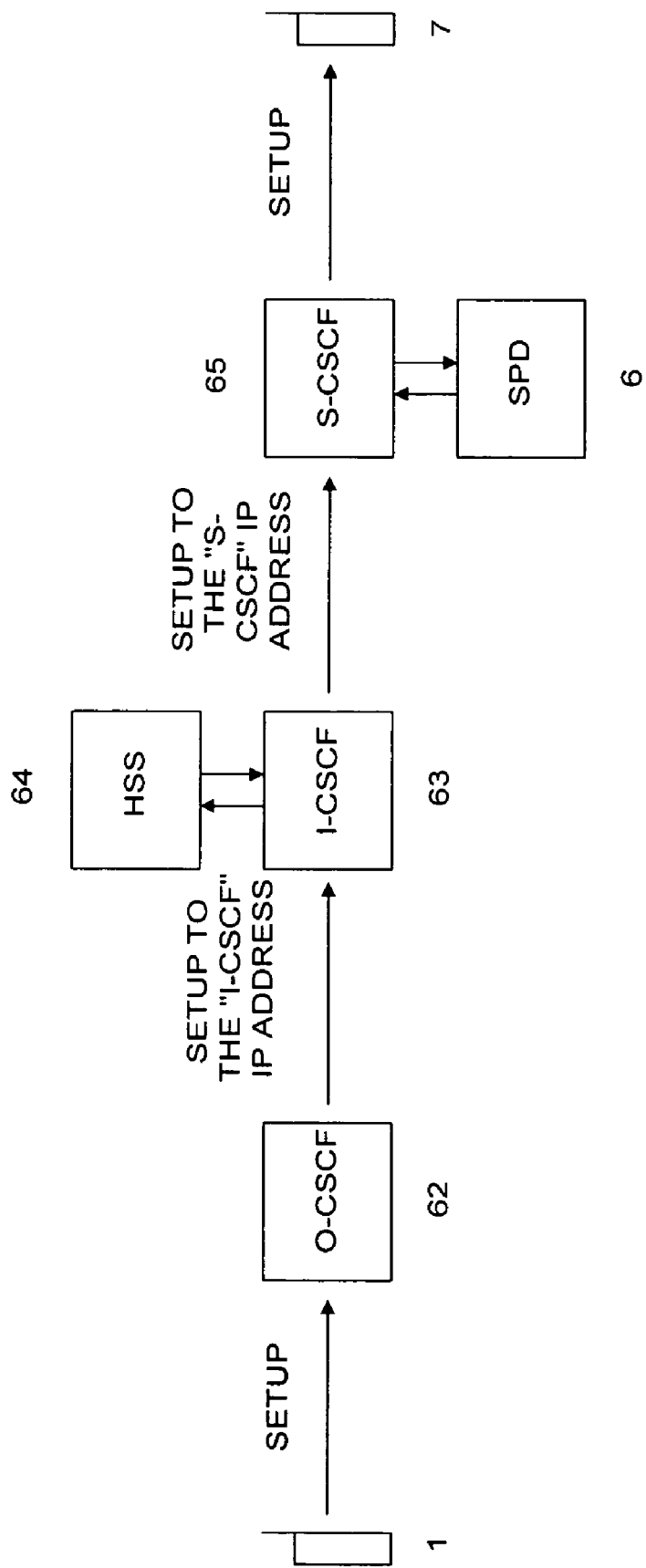
FIG. 6 shows a block diagram of a network system according to a sixth embodiment.

As shown in FIG. 6, the O-CSCF 62 sends a setup message to the I-CSCF IP address of the CSCF 63. Thus, the CSCF 63 knows automatically that is should act as an I-CSCF and, correspondingly, performs a location request by referring to the HSS 64. The I-CSCF 63 obtains from the HSS 64 the location of the called mobile station 7 and the S-CSCF IP address of the CSCF in charge of the mobile station 7. Thus, the I-CSCF 63 sends a setup message to the S-CSCF IP address of the CSCF 65, which, in turn, automatically knows that it has to act as an S-CSCF.

Thus, also according to the sixth embodiment, an easy method for deciding whether a particular CSCF has to act as an I-CSCF or as an S-CSCF can be obtained. It is only necessary to provide two different IP addresses for each CSCF and to send a setup message to the corresponding IP address of the CSCF.

Next, a seventh embodiment is described with reference to FIG. 7.

According to the seventh embodiment, the setup message is sent from a specialised port. This corresponds to items B.a.b. and X1 of the above-described general idea of the invention.

Figure 7:
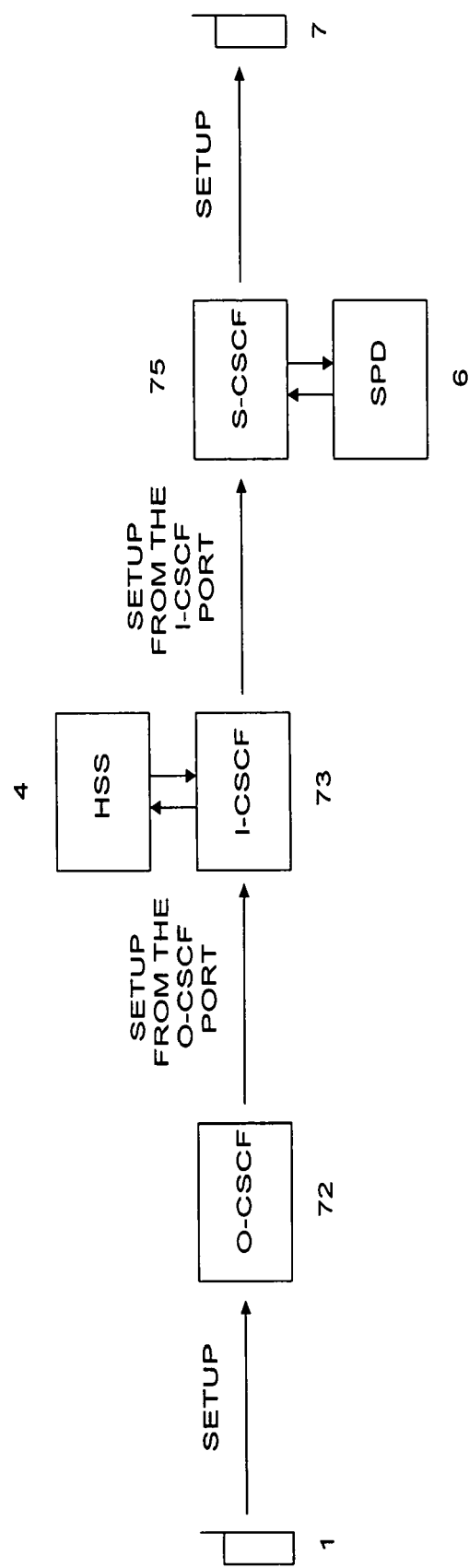
FIG. 7 shows a block diagram of a network system according to a seventh embodiment.

That is, the O-CSCF 72 sends the setup from the O-CSCF port thereof to the CSCF (i.e., in the example of FIG. 7, to the CSCF 73). The CSCF 73 identifies itself as an I-CSCF because the setup was sent from the O-CSCF port of the CSCF 72. The I-CSCF 73 makes a Location Request to the HSS 4, which responds with the IP address of the S-CSCF of the UE 7 to be contacted. Thus, the I-CSCF sends the setup from the I-CSCF port with the IP address to the CSCF 75. The CSCF 75 identifies itself as an S-CSCF, since it receives the setup message sent from the I-CSCF port of the I-CSCF 73.

Figure 8:
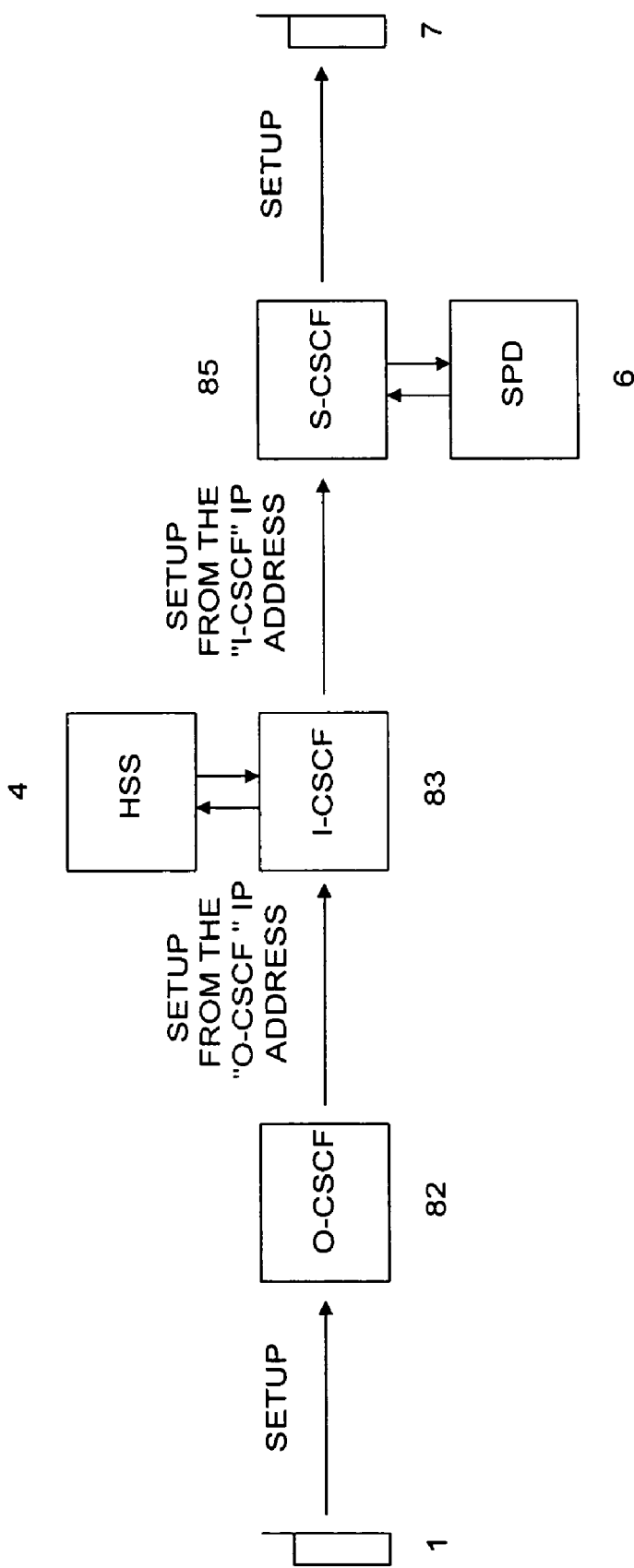
FIG. 8 shows a block diagram of a network system according to an eighth embodiment.
Figure 9:
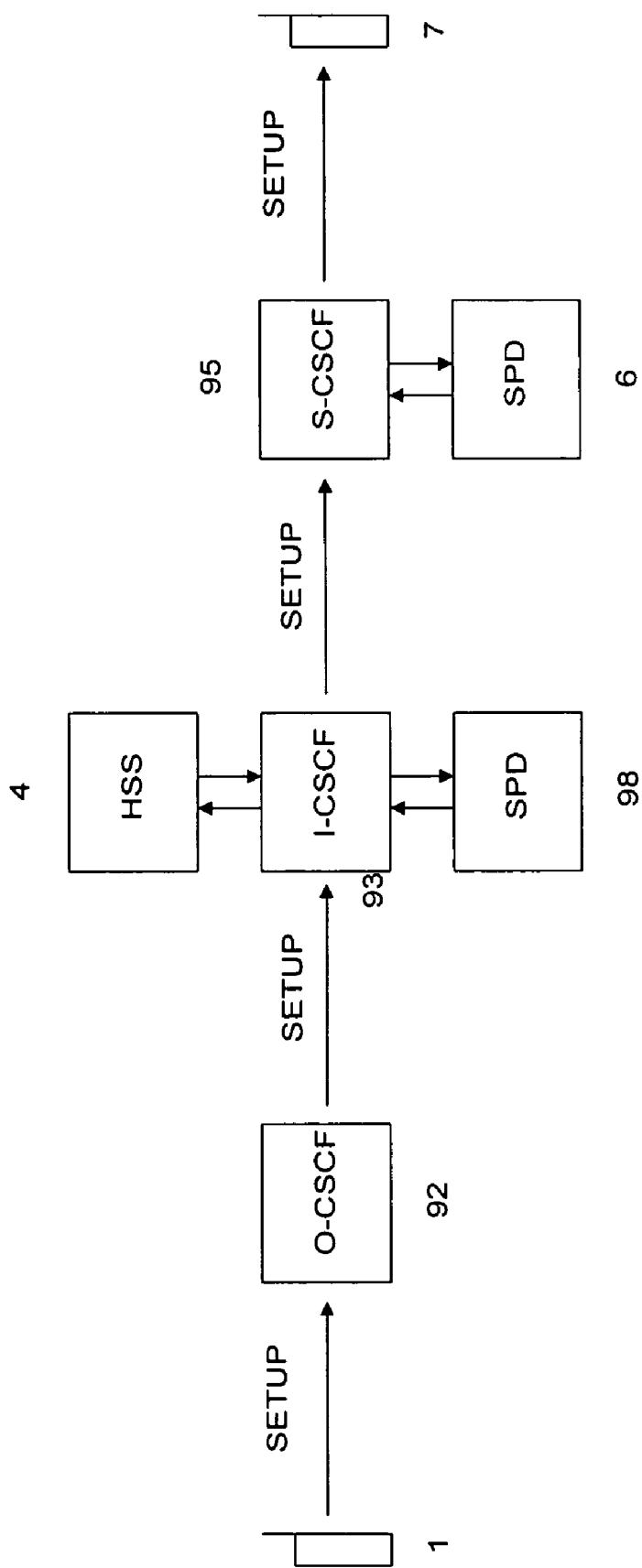
FIG. 9 shows a block diagram of a network system according to a less optimal CSCF mode determination method.

In the following, an eighth embodiment is described with reference to FIG. 8.

According to the eighth embodiment, the setup message is sent from a specialised address. Thus, the eighth embodiment corresponds to the items B.a.b. and X1 of the above-described general idea of the invention.

In this embodiment, the O-CSCF 82 sends the setup message from an "O-CSCF" IP address to the CSCF 83. The CSCF 83 identifies itself as an I-CSCF because the setup was received from the O-CSCF IP address. The I-CSCF 83 makes a Location Request to the HSS 4, which responds with the IP address of the S-CSCF of the UE 7 to be contacted. Thereafter, the I-CSCF sends the setup message to the S-CSCF 85 having the IP address obtained from the HSS 4. The CSCF 85 identifies itself as an S-CSCF because the setup message was received from the "I-CSCF" IP address.

Next, a ninth embodiment is described with reference to FIG. 10.

According to the present embodiment a Location Request to HSS is performed in order to find out whether the setup concerns a registered subscriber. Thus, the ninth embodiment corresponds to items B.b.a and X7 of the above-described general idea of the invention.

In detail, when the CSCF 103 receives a setup message from the O-CSCF 102, it performs a Location Request to the HSS 4 in order to find out, whether the setup concerns a registered subscriber. If the answer is yes, the CSCF is an S-CSCF, otherwise it is an I-CSCF.

Figure 10:
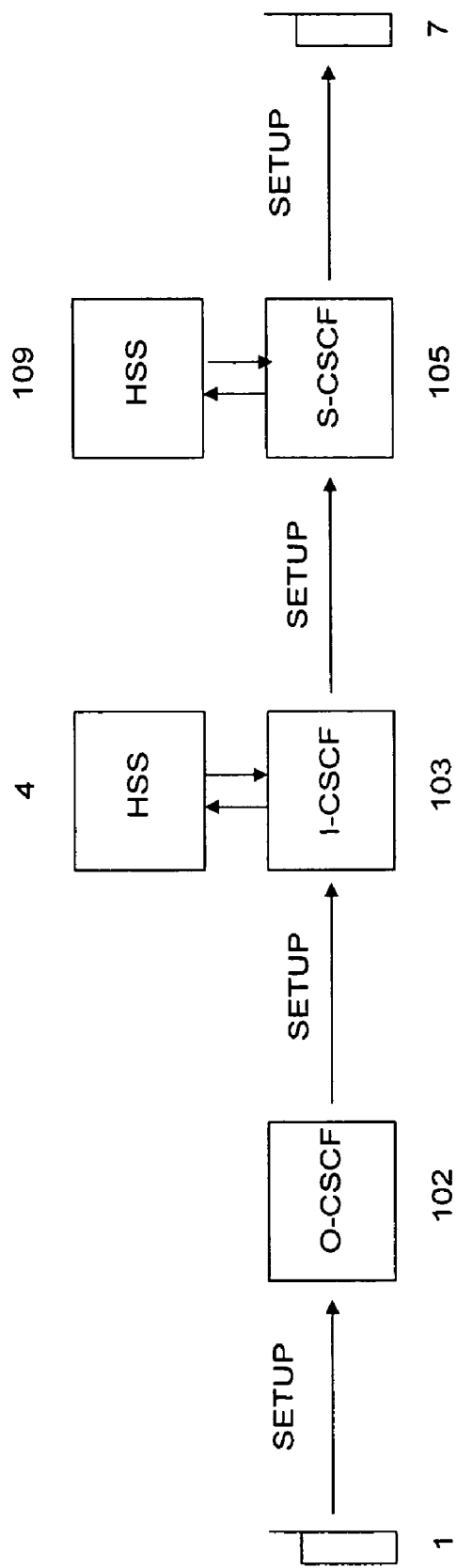
FIG. 10 shows a block diagram of a network system according to a ninth embodiment.

In the example shown in FIG. 10, the CSCF 103 obtains the information from the HSS 4 that the UE 7 is not a registered subscriber. Thus, the CSCF identifies itself as an I-CSCF.

On the other hand, the CSCF 105 obtains from its HSS 109 the information that the UE 7 is a registered subscriber. Hence, the CSCF 105 identifies itself as an S-CSCF.

Although the processes according to the ninth embodiment are more complicate than that according to the first to eight embodiments due to accessing the HSS and/or SPD, they offer the advantage that a very reliable decision on whether a CSCF in question is an I-CSCF or an S-CSCF.

The above description and accompanying drawings only illustrate the present invention by way of example. Thus, the embodiments of the invention may vary within the scope of the attached claims.

For example, the different functions (in particular I-CSCF functionality and S-CSCF functionality) of a CSCF are only used as examples. It can also be distinguished between O-CSCF, I-CSCF, S-CSCF and MGCF functionality and others.

According to the first to third embodiments, a flag is used for indicating that the location request has to be done or has been done. However, this information can be carried by two or more flags. Alternatively, this information can be written in one or more extra data fields.

Furthermore, instead of IP address and/or port as described above, any address of the other levels of the protocol stack can be used. For example in the case of ethernet media, the ethernet address (i.e. media level address) can be used.

Moreover, according to the embodiments described above, the I-CSCF and the S-CSCF are represented as separated entities. However, it is also possible that the I-CSCF which performs the location request recognises that the called mobile station 7 is in the range of itself such that the I-CSCF has to operate as the S-CSCF.

Therefore, the I-CSCF has to switch itself to the other mode, i.e., to the S-CSCF functionality. This can be effected by sending a setup message including a flag to itself (as in the first and second embodiments), or by sending the setup message to the S-CSCF port or S-CSCF IP address (as in the fifth and sixth embodiments), for example.

The same applies for the O-CSCF. That is, the O-CSCF and the I-CSCF or the S-CSCF can be the same entity.

Moreover, it is possible that the CSCF contacted by the O-CSCF in order to perform a location request is not able to perform the location request. In this case, this particular CSCF has to forward the setup message received unchanged to a further CSCF which presumably can perform the location request. That is, for example with respect to FIG. 1, between the O-CSCF 2 and the I-CSCF 3, a further intermediate CSCF can be located.

Furthermore, the location request has been mentioned as one example for a procedure which has to be carried out or which has been carried out. That is, this procedure is not limited to processing of the location request.

In addition, it is noted that with regard to the 3GPP (third generation partnership project) architecture it is probable that the O-CSCF might also be located in another network than the network currently serving the originating party. This means that a CSCF with an ICGW functionality will be required on the network border between the serving network and O-CSCF. In other words this ICGW (on the network border) determines the CSCF serving the originating party.

Correspondingly, if the same network element (NE) is working both as an ICGW (I-CSCF) on the originating side and an O-CSCF, it need to know if the ICGW or CCF functions should be invoked in a similar way as the I-CSCF and S-CSCF issues are described in the application.

Moreover, the network element is not limited to a CSCF. The invention can also be applied to other network elements which can be switched between different modes.

For example, if a CPS (Call Processing Server) contains both MGCF and CSCF functionality, some method is required to determine if the MGCF or CSCF functions should be invoked when a setup is received. This can be performed correspondingly to the procedures described above.

Furthermore, the invention can also the applied to a Home Subscriber Server (HSS). The HSS can be seen to contain the following modes: Registration functionality, Location Update functionality, Location Request functionality, and Retrieval of Subscriber Profile functionality.

This invention can directly be applied also to HSS to help it to switch to the correct mode when a message is received. In the following, the modifications to the embodiments above are described in short.

That is, the first embodiment has to be modified such that a message received by the HSS contains a flag that tells what has been done. The HSS deduces what it has to do next. For example HSS receives a message with flag "Registration done" and switches to the mode "Location Update".

The second embodiment has to be modified such that the message received by the HSS contains a flag that tells what has to be done next. For example HSS receives a message with flag "Do Location Update" and switches to the mode "Location Update".

The third embodiment described above has to be modified in this case such that there is a special message for each functionality. For example, the subscriber profile has to be retrieved. When the HSS receives the corresponding message it switches to the "Retrieval of Subscriber Profile" mode.

The fourth embodiment described above has to be modified in this case such that there is a special HSS that only does Location Updates. When it receives a message it always switched to the mode "Location Update".

The fifth embodiment described above has to be modified in this case such that there is a special port for each mode. When certain functionality is needed the message is sent to the corresponding port.

The sixth embodiment in this case has to be modified such that there is a special IP address for each mode. When certain functionality is needed the message is sent to the corresponding IP address.

The seventh embodiment has to be modified in this case such that there is a special port for each mode. When certain functionality is needed the message is sent from the corresponding port.

The eighth embodiment in this case has to be modified such that there is (are) special IP address(es) for each mode. When certain functionality is needed the message is sent from the corresponding IP address.

The different methods presented above can be arbitrarily combined. By doing so, a more reliable determining of the role of the network element, i.e., the CSCF, in question can be obtained. For example, the processes described in the ninth embodiment can be combined with the processes according to one or more of the first to eight embodiments. Moreover, two of the first to eight embodiments can be combined, and when the two procedures lead to different results (due to some kind of failure), a procedure according to the ninth embodiment can be executed.

The invention can be applied to any problem where one or more network elements have at least two functionalities, functions, modes, states or alike.

Furthermore, the invention is not bound to the IP protocol and its address mechanism. The invention can be applied to other communication protocols and their address mechanisms as well. In that case the IP address is replaced with the address of the new communication protocol. Similarly the port, which can be seen as subaddress of IP address, is replaced with the subaddress of the new protocol.

Especially, the invention can be applied to load sharing and load balancing problems. In networks, load sharing may be a problem. The problem arises when there are more than one similar network elements available that can accomplish the same task. The problem becomes more complicated when the tasks are not same in size and when many sources of tasks exist. There are two main methods how the load can be divided among the similar network elements. The load sharing is a method that simply divides each task between the network elements without concerning whether the total load is equally divided among the elements. The load balancing is a method that tries to divide each task between the network elements so that the total load of each element will be equal. In the load sharing/balancing the processing of the load sharing/balancing algorithm in order to choose the most optimal network element for the current task can be seen as one mode of the network element. To accomplish the task itself can be seen as another mode of the network element.

In the following, some example of load sharing/balancing problem are described in short. Two cases are considered: the first case is that only one or a few network elements can do load sharing/balancing, whereas the second case is that all network elements can do load sharing/balancing.

For example, for the first case the fourth embodiment describing the gateway method can be applied. In this case, when receiving a message, the element does the load sharing/balancing and sends the message further to the chosen network element.

Another application for the first case is the third embodiment. When receiving a special message, the element does the load sharing/balancing and sends a reply message that tells the address where the message has to be sent.

For the second case, the method according to the first embodiment can be applied. Thus, when receiving a message the "load sharing/balancing has been done" flag is unset, the network element does load sharing/balancing, sets the "load sharing/balancing has been done" flag and sends further the message to the chosen element.

Moreover, for the second case the what-has-to-be-done message solutions i.e. the second embodiment can be applied. When receiving a message, there is a "load sharing/balancing has to be done" flag. The network element does load sharing/balancing, unsets the "load sharing/balancing has to be done" flag and sends further the message to the chosen element.

Furthermore, also the fifth embodiment can be applied to the second case. Here, when receiving a message to the default port the network element does load sharing/balancing and sends further the message to the special port of the chosen element.

Also the sixth embodiment can be applied to the second case. When receiving a message to the default IP address the network element does load sharing/balancing and sends further the message to the special IP address of the chosen element.

Moreover, the seventh embodiment can be applied to the above-described second case. Then, when receiving a message from the default port the network element does load sharing/balancing and sends further the message from the special port to the chosen element.

Furthermore, also the eighth embodiment can be applied to the second case. When receiving a message from certain IP addresses the network element does load sharing/balancing and sends further the message from the special IP address to the chosen element.

Especially, the invention can be applied as described above to the load sharing and load balancing problems in case where the load has to be shared/balanced among several HSS, in case where the load has to be shared/balanced among several I-CSCF, and in case where the load has to be shared/balanced among several CSCF at the registration.

In the HSS case all received messages from I-CSCF and S-CSCF can be seen as load that has to be shared/balanced among HSS network elements. One or more of the HSS network elements may do the sharing/balancing process or there may be a specialized network element for it. Several embodiments can be applied depending on the structure of the solution.

In the I-CSCF case call setup messages originating from another network or even from the own network to CSCF network elements capable of functioning in I-CSCF mode can be seen as load that has to be shared/balanced between the CSCF network elements in question. There may be one or more boarder gateways that shares/balances the load originating from another network(s). Several embodiments can be applied depending on the structure of the solution.

In the registration case the registrations to the network can be seen as load that has to be shared/balanced among CSCF network elements. A specialized network element or so called proxy may exist to accomplish the sharing/balancing process. Several embodiments can be applied depending on the structure of the solution. For example if the registrations have to be shared among three CSCF network elements and a proxy is used, the load sharing algorithm can simply be rotation. According to the rotation method the proxy chooses the first CSCF for the first registration, the second CSCF for the second registration, the third CSCF for the third registration, the first CSCF for the forth registration, the second CSCF for the fifth registration, and so on. On the other hand the load balancing can simply be done with the help of a table telling the load of each CSCF. The load balancing algorithm tells the proxy to choose always the CSCF for the registration that has the lowest load at the moment. Each CSCF updates the table of load according to its actual load.

In addition, the invention can be advantageously applied to the Session Initiation Protocol (SIP). However, as a matter of course, the invention is not limited thereto but can be applied also to other suitable protocols.

When using the SIP, the decision between the I-CSCF or S-CSCF functionality can be carried out in an alternative way. In particular, the CSCF can analyse the SIP message via field and check whether it contains a known node name (i.e., certain gateway node names). Based on these node names it can be determined whether the SPD inquiry (i.e., the S-CSCF functionality) is needed or whether the HSS (UMS) could be inquired directly (i.e., the I-CSCF functionality should be selected). This is similar to the seventh and eights embodiments and corresponds to the items B.a.b and X1 and also to A.b and X3 of the general idea of the invention.

For example, with respect to FIG. 7, this means that the I-CSCF 73 sends a normal SIP setup message to the CSCF 75. The CSCF 75 checks whether it knows the sending node, i.e., the I-CSCF 73. If this is the case, the CSCF 75 knows that it should act as an S-CSCF.

In particular, the node name in the set-up message VIA-header is an indicator indicating the status of the call (inquiry done or pending).

In the SIP Invite message (i.e. the call set-up message) there is a VIA-header which lists logical names (i.e. domain names) or addresses of nodes that have participated in the routing of the call. The VIA-header of the SIP Invite message can be inspected by a CSCF (I-CSCF or S-CSCF) to determine where the call is coming from and what kind of a call it is question of. By the kind of the call is meant whether the call is a roaming call i.e. the HSS enquiry has been performed. The possible node types searched from the via header include:

I-CSCF nodes own network O-CSCF nodes proxies between networks dedicated for calls where the called party subscription network is the receiving network i.e. the HSS enquiry has not been performed proxies between networks dedicated for calls for which the HSS enquiry has been performed and where the called party serving network is the receiving network It is assumed that there is a mapping from proxy names to proxy types in the CSCF analysing the via header.

In the most naive case, the VIA-header can be inspected for existence of possible I-CSCF node names or addresses. In accordance with the first embodiment of the present invention, the presence of a name of a node acting as an I-CSCF in the via header indicates that the HSS enquiry has been performed.

In a more elaborate case, for instance, if the call is coming in from a first network as an incoming call to a subscriber of the receiving second network, it can be conceived that the VIA-header contains node names or a node addresses referring to at least one proxy node between the first and the second network which is dedicated for handling of incoming calls where the subscription of the called party is in the second network.

Similarly, if the HSS enquiry has been performed in the first network and the called subscriber is roaming in the second network, it can be conceived that there is a specific proxy or a set of specific proxies between the first and second network dedicated for routing roaming call legs subsequent to HSS enquiry. The CSCF in the second network can determine by analysing the via header the types of proxies that have routed the call. Depending on the proxy names or addresses it can determine whether the HSS enquiry has been performed or not.

The inspection of SIP invite message via header described herein can be applied to the fourth embodiment of the invention. The S-CSCF receiving the call from the G-CSCF can inspect the node names or addresses in the via-header. If there is no valid G-CSCF node in the list or there is no node name or address referring to a node in a different network, the S-CSCF can reject the call and determine that a routing error has occurred.

The invention claimed is:

1. An apparatus, comprising:
   a controller configured to operate in at least two different modes,
   wherein the controller is further configured to receive a message and further configured to set a mode in response to whether the message comprises information or not, wherein the information indicates whether a particular procedure is to be performed or has been performed,
   wherein the procedure is configured to process a location request, and
   wherein the controller is a call control entity configured to supervise a call.

2. The apparatus of claim 1, wherein the message is without the information regarding the procedure, and wherein the controller is further configured to set itself into a first mode and further configured to perform the procedure in response to receiving the message without the information.

3. The apparatus of claim 2, wherein the controller is further configured to send a message comprising information that the procedure was performed to a second network element for setting the second network element into a second mode in response to receiving the message comprising the information that the procedure was performed.

4. The apparatus of claim 1, wherein the controller is further configured to set itself into a first mode and further configured to perform the procedure in response to receiving the message comprising the information that the procedure is to be performed.

5. The apparatus of claim 4, wherein the controller is further configured to send a message without information regarding the procedure to a second network element for setting the second network element into a second mode in response to receiving the message without information regarding the procedure.

6. The apparatus of claim 4, wherein the controller is further configured to perform the procedure in response to receiving the message comprising the information that the procedure has to be performed, and further configured to send a result of the procedure to a first network element having sent the message to the controller.

7. The apparatus of claim 6, further comprising:
   wherein the controller is further configured to send a message without information regarding the procedure to a third network element for setting the third network element into a second mode in response to receiving the message without information regarding the procedure.

8. The apparatus of claim 1, wherein the controller is a call state control function.

9. The apparatus of claim 1, wherein the message is a call setup message.

10. The apparatus of claim 1, wherein the message comprises the information regarding the procedure in a flag within the message.

11. The apparatus of claim 1, wherein the information regarding the procedure is obtained by inspecting the via-header of the message.

12. An apparatus, comprising:
    a controller configured to operate in at least two different modes,
    wherein the at least two different modes comprise a first mode and a second mode,
    wherein the controller is further configured to receive a message from a first network element comprising a function and further configured to set a mode in response to receiving the message from the first network element comprising the function, and
    wherein the controller is a call state control function, the first mode comprises a mode of an interrogating call state control function, and the second mode comprises a mode of a serving call state control function.

13. The apparatus of claim 12, wherein the function of the first network element is a gateway function.

14. The apparatus of claim 13, wherein the first network element is a gateway call state control function.

15. The apparatus of claim 12, wherein the message is a call setup message.

16. The apparatus of claim 15, further comprising:
    a subscription controller configured to perform an access to a database in order to obtain information regarding a subscriber to which a setup is to be sent and further configured to decide the mode of the controller based on the obtained information.

17. An apparatus, comprising:
    a controller configured to operate in at least two different modes,
    wherein the controller is further configured to receive a message from a first network element,
    wherein the controller comprises a plurality of connectors corresponding to the different modes, and
    wherein the controller is further configured to set a mode in response to a connector via which the message is received from the first network element and further configured to perform a location request in response to the connector via which the message is received from the first network element.

18. The apparatus of claim 17, wherein the plurality of connectors are ports of the controller.

19. The apparatus of claim 17, wherein the plurality of connectors are different internet protocol addresses from which the message is sent or to which the message is sent.

20. The apparatus of claim 17, wherein the controller and the first network element are call state control functions.

21. The apparatus of claim 17, wherein the message is a setup message.

22. The apparatus of claim 21, further comprising:
    a subscription controller configured to perform an access to a database in order to obtain information regarding a subscriber to which a setup is to be sent and further configured to decide the mode of the controller based on the obtained information.

23. The apparatus of claim 21, further comprising:
    a controller configured to perform an access to a database in order to obtain information regarding a subscriber to which a setup is to be sent and further configured to decide the mode of the controller based on the obtained information.

24. A method, comprising:
receiving a message;
extracting information from the message regarding a procedure which has to be performed or which has been performed; and
deciding, with a controller, a mode to be set for a network element based on the extracted information,
wherein the network element is configured to operate in at least two different modes,
wherein the procedure comprises processing a location request, and
wherein the network element is a call control entity configured to supervise a call.

25. The method according to claim 24, wherein the network element is a call state control function.

26. The method according to claim 24, wherein the message is a setup message.

27. The method according to claim 26, further comprising:
accessing a database in order to obtain information regarding a subscriber to which a setup is to be sent and to decide the mode of the second network element based on the obtained information.

28. The method according to claim 24, wherein the procedure is obtained by inspecting the via-header of the message.

29. A method, comprising:
receiving a message; and
deciding, with a controller, a mode to be set for a first network element based on a function of a second network element sending the message,
wherein the first network element is configured to operate in at least two different modes,
wherein the at least two different modes comprises a first mode and a second mode, and
wherein the first network element is a call state control function, the first mode comprises a mode of an interrogating call state control function, and the second mode comprises a mode of a serving call state control function.

30. The method according to claim 29, wherein the network element sending the message is an originating call state control function.

31. The method according to claim 29, wherein the message is a call setup message.

32. The method according to claim 31, further comprising:
accessing a database in order to obtain information regarding a subscriber to which a setup is to be sent and to decide the mode of the second network element based on the obtained information.

33. The method according to claim 31, further comprising:
accessing a database in order to obtain information regarding a subscriber to which a setup is to be sent and to decide the mode of the second network element based on the obtained information.

34. A method, comprising:
receiving a message;
deciding, with a controller, a mode to be set for a network element based on an input via which the message is received, and
performing a location request based on the input via which the message is received.

35. The method according to claim 34, wherein the input are ports.

36. The method according to claim 35, wherein the network element is a call state control function.

37. The method according to claim 34, wherein the input are different internet protocol addresses.

38. The method according to claim 34, wherein the message is a setup message.

* * * * *

UNITED STATES PATENT AND TRADEMARK OFFICE
CERTIFICATE OF CORRECTION

PATENT NO.      : 7,602,762 B1                                 Page 1 of 1
APPLICATION NO. : 10/333757
DATED           : October 13, 2009
INVENTOR(S)     : Kauppinen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1477 days.

Signed and Sealed this

Fifth Day of October, 2010

David J. Kappos
*Director of the United States Patent and Trademark Office*